United States Patent [19]
Lang-Ree

[11] 4,179,948
[45] Dec. 25, 1979

[54] SHAFT MOUNTING
[75] Inventor: Nils Lang-Ree, Los Altos, Calif.
[73] Assignee: NPI Corporation, Burlingame, Calif.
[21] Appl. No.: 890,134
[22] Filed: Mar. 27, 1978
[51] Int. Cl.² .......................................... F16H 7/10
[52] U.S. Cl. ........................ 74/242.15 R; 74/242.12; 74/245 C; 198/814
[58] Field of Search ............ 51/148; 57/105; 192/11; 198/814, 815, 813; 74/245 R, 245 C, 242.9, 242.12, 242.15

[56] References Cited
U.S. PATENT DOCUMENTS

| | | | |
|---|---|---|---|
| 1,188,725 | 6/1916 | Brown | 198/814 X |
| 1,224,188 | 5/1917 | Malm | 198/813 X |
| 1,789,571 | 1/1931 | Wanamaker | 74/242.15 R |
| 2,368,848 | 2/1945 | Krueger | 74/242.15 R |
| 3,436,979 | 4/1969 | Molitor | 74/242.15 R |
| 3,718,197 | 2/1973 | Barten et al. | 198/814 X |
| 3,773,166 | 11/1973 | Nowacki | 198/814 X |
| 3,861,519 | 1/1975 | Ware | 198/814 X |

FOREIGN PATENT DOCUMENTS

| | | | |
|---|---|---|---|
| 871391 | 3/1953 | Fed. Rep. of Germany | 74/242.15 R |
| 182180 | 1/1963 | Sweden | 198/814 |
| 424504 | 2/1935 | United Kingdom | 198/814 |
| 1087108 | 10/1967 | United Kingdom | 198/814 |

Primary Examiner—Leslie Braun
Attorney, Agent, or Firm—Lothrop & West

[57] ABSTRACT

A shaft mounting on a frame includes a strap with an opening in it through which slidably projects a plunger also guided in an aperture in a clip joined to the strap. The plunger is pressed in one direction by a spring. A shaft lying across the strap is seated in a partially open, arcuate groove in a rectangular block. The groove has a surface curved about the axis of the shaft and is located at different distances from the various flat sides of the block. The block, in engagement with the shaft, is rolled between different positions against the strap and a position against the plunger and a bracket on the strap below the block.

9 Claims, 4 Drawing Figures

U.S. Patent  Dec. 25, 1979  4,179,948
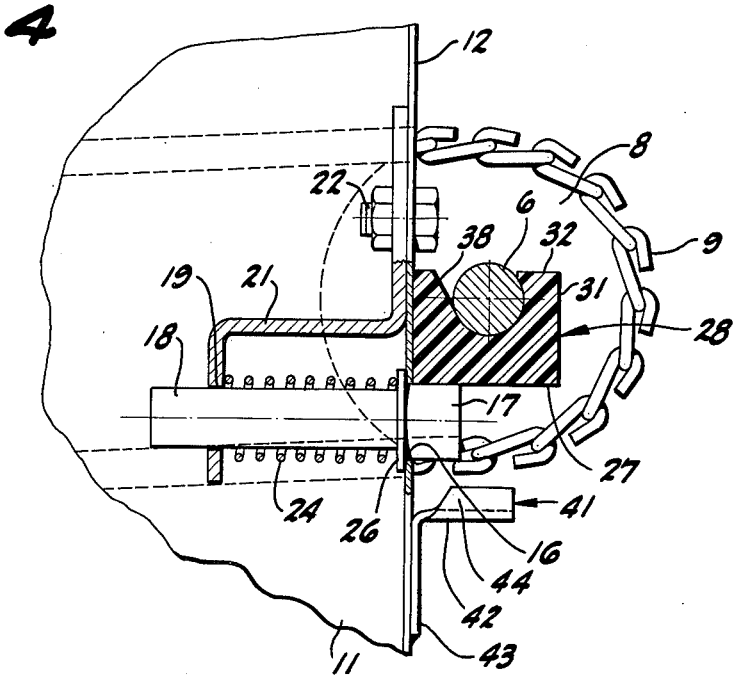
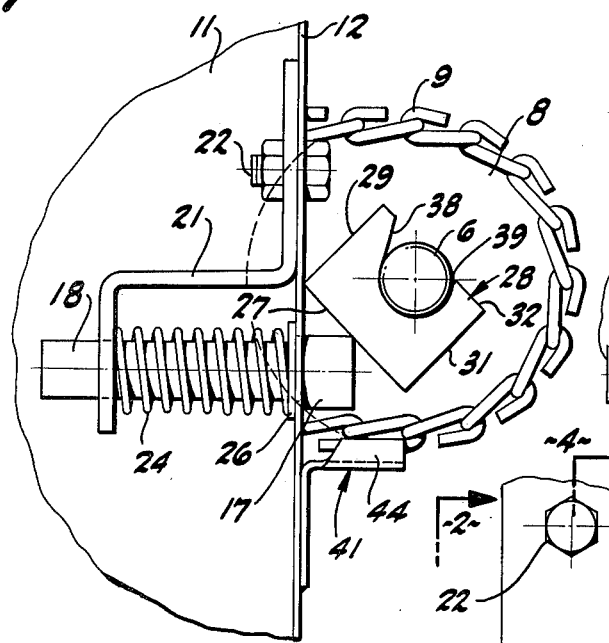
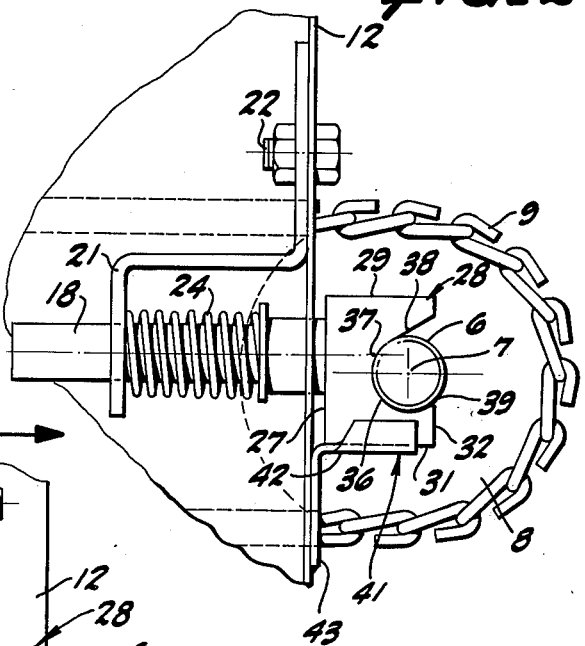
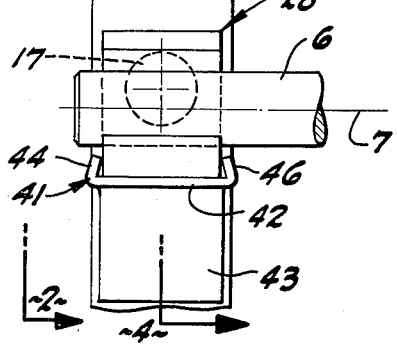

SHAFT MOUNTING

BRIEF SUMMARY OF THE INVENTION

In various machines utilizing conveyors trained around sprockets on a shaft, it is advisable to be able to adjust the tension of the conveyor chain and maintain it substantially at a fixed value. It is also highly important in some machines, such as food preparation machines, to be able to disassemble the shaft and its associated parts very easily for frequent cleaning purposes and to be able equally well to reassemble the parts for further operation. It is desirable that this assembly and disassembly be accomplished without the use of tools and simply by hand.

For this reason, on a frame strap of the device utilizing the shaft, there is provided a rectangular block having an arcuate groove therein designed to receive the shaft, with the block adapted to abut a strap portion of the frame in any of several positions since the groove center in the block is spaced at different distances from the various faces of the block. Projecting from the strap is a plunger that is spring-pressed. The block can be rolled between successive positions and against the plunger to be subject to spring pressure and also into a position between the plunger and a bracket projecting from the strap. This is the position in which operation normally proceeds. Simply by rolling the block into and out of its position against the bracket, the shaft is freed sufficiently from its mounting on the frame to permit easy disassembly and assembly.

BRIEF DESCRIPTION OF THE SEVERAL VIEWS OF THE DRAWING

FIG. 1 is a front elevation, portions being broken away, of a shaft mounting constructed pursuant to the invention and shown in its normal operating position.

FIG. 2 is a side elevation of the structure shown in FIG. 1, the view being taken as shown by the line 2—2 of FIG. 1.

FIG. 3 is a view comparable to FIG. 2 but showing the block in a partially disassembled location.

FIG. 4 is a view in cross-section, the plane of which is generally indicated by the line 4—4 of FIG. 1, and showing the block in a location for disassembly.

DETAILED DESCRIPTION

In a typical environment, a shaft 6 designed to rotate about an axis 7 carrying one or more sprockets 8 engaged with an openwork, cross bar chain conveyor 9, for example, is utilized in connection with a machine frame 11. The frame is inclusive of a vertically extending strap 12. Since the mechanism is usually duplicated on opposite sides, a description of but one side is given.

The strap 12 is provided with an opening 16 through which a plunger head 17 is movable. The plunger head merges with a plunger body 18 of somewhat smaller diameter and slidable through an aperture 19 in a clip 21 secured to the strap 12 by a removable fastener 22. The aperture 19 and the opening 16 are in axial alignment so that the plunger is freely slidable therein. The plunger is urged in one direction by a spring 24 bearing against the clip 21 and also bearing against a washer 26 adapted to abut the strap 12 and to abut the plunger head 17.

In the normal operating position of the parts, the plunger head 17 is in abutment with one of the flat faces 27 of a bearing block 28. The block is fabricated of a suitable anti-friction, preferably plastic, material such as Teflon and is generally rectangular in outline, being bounded not only by the face 27, but also by a second face 29, a third face 31 and a fourth face 32. The distance of the face 27 from the axis 7 is a predetermined amount, whereas the distance from the face 32 to the axis 7 is a lesser amount. The distance from the axis 7 to either of the faces 29 and 31 is substantially less than the distance from the axis 7 to the face 27, although the distance from the axis to either face 29 or or 31 may be equal.

The block 28 is also formed with a bearing surface 36 having an arcuate central portion 37 generated about the axis 7 as a center. The surface 37 merges with a tangent surface 38 opening through the face 32 at an upwardly inclined angle, as seen in FIG. 2. The arcuate surface 37 also terminates at a point of tangency 39 and opens upwardly through the face 32 as well.

In the normal operating condition, the face 27 of the block 28 rests against the plunger head 17, as shown in FIG. 2, and also is supported by and rests on a bracket 41 having a bottom plate 42 underlying the surface 31 and bent downwardly at an angle to provide a tab 43 permanently secured to the strap 12. The bracket 41 likewise has a pair of slightly inturned side flanges 44 and 46 (see FIG. 1) fitting the sides of the block 28 loosely enough so that the block is freely slidable to and fro on the plate 42.

In normal operation, the relationships of the parts are as shown in FIGS. 1 and 2, with the spring 24 exerting sufficient force against the plunger head 17 so that the block 28 is spaced away from the strap 12 an amount dependent largely upon the resisting force of the chain 9. The chain is then relatively tight or as tight as is necessary for satisfactory operation. Variations in chain dimensions due to changes in temperature and other factors are effective to move the block to and fro on the bracket plate 42 as regulated by the resistance of the spring 24.

When the mechanism is to be dismantled for cleaning, replacement, repair, inspection, or the like, it is merely necessary for the attendant to grasp the shaft 6, for example, and in effect to roll the shaft 6 generally upwardly and approximately into the position shown in FIG. 3. The upward motion of the shaft is effective to rotate the block 28 and variably depress the plunger head 17, so that the corner of the block can fulcrum on the strap. The moving block acts as a sort of lever to move the shaft 6 upwardly, the upward shaft motion being continued with that of the block until the parts arrive substantially in the position shown in FIG. 4.

In this position, the block has rotated to put the second surface 29 against the surface of the strap 12 and with the center of the shaft closer to the strap and permitting some looseness or slack in the conveyor chain 9. With slack, the shaft 6 can then be lifted upwardly out of the groove 37 in the block 28. The block may then be withdrawn. When the shaft is lifted away from or out of the block, it is then simple to move the shaft to any desired location so that it can be removed from the chain conveyor or otherwise handled.

If the upward movement of the shaft from FIG. 2 position through FIG. 3 position and into FIG. 4 position is done with a certain continuous alacrity, there is a tendency for the block to snap over from its FIG. 2 position through its FIG. 3 position and into its FIG. 4 position and easily to release the shaft.

In a similar fashion but in the reverse direction, when the parts are to be assembled and when the conveyor chain is around its sprockets and the shaft is available for repositioning, the shaft then can be dropped into the bearing 37 and pushed downwardly, whereupon the shaft and block together move with the block rotating around the corner of the plunger 17 and then depressing the plunger head into a position comparable to that shown in FIG. 2. The block finally comes to rest with its face 27 against the end of the plunger and with its face 31 against the face of the bracket plate 42.

In the position of operation, the center of pressure of the spring 24 is generally along the axis of the plunger, which is slightly above the rotational axis 7 of the shaft, so that the forces tend, partly on account of the inclined surface 38, to keep the block and shaft in their lowermost position firmly supported on the bracket 41. The shaft is well confined against the force of gravity because of the fulcrum or tangency point 39.

There is thus provided a very easily assembled and disassembled shaft mounting and one which operates with the forces tending to maintain the parts in proper operating position.

I claim:

1. A shaft mounting comprising a frame including a planar strap having an opening therein, a shaft rotatable about an axis parallel to and spaced from the plane of said strap, a rotatable bearing block adapted to overlie said opening and having a groove therein of an extent adapted to engage less than a half-circumference of said shaft and defined by an arcuate surface the elements of which are parallel to said axis, said block having at least some flat bounding surfaces at right angles to each other and parallel to and at predetermined distances from said axis, means for supporting said block with one of said flat bounding surfaces parallel to said strap, and means for urging said one of said flat surfaces of said block away from said strap.

2. A device as in claim 1 in which said urging means includes a plunger slidable within said opening and engageable with one of said flat bounding surfaces, and a spring pressing said plunger to slide toward one extreme position against said one of said flat bounding surfaces.

3. A device as in claim 1 in which said means for supporting said block is a bracket slidably engageable with a second of said flat bounding surfaces and mounted on said strap.

4. A device as in claim 1 in which said bracket in cross-section parallel to said axis and to said planar strap has a channel-shape bearing groove.

5. A device as in claim 2 including a clip on said strap and having an aperture therein in axial registry with said opening and in which said plunger is also slidable.

6. A device as in claim 1 in which said bearing block is positionable with said one of said flat bounding surfaces against a side of said plunger and a second of said flat bounding surfaces abutting said strap when said shaft is displaced laterally from the normal position of said shaft.

7. A device as in claim 1 in which said bearing block is positionable with said one of said flat bounding surfaces against the end of said plunger and a third of said flat bounding surfaces slidable on said bracket when said shaft is in normal position.

8. A device as in claim 1 in which said flat surfaces are in parallel planes at right angles to each other and said groove is bounded in part by a pair of surfaces parallel to said flat surface and to each other and in planes inclined with respect to said parallel planes.

9. A device as in claim 1 in which said axis of said shaft when said bearing block is in normal position on said bracket is below the central axis of said plunger.

* * * * *